(12) United States Patent
Kitai et al.

(10) Patent No.: US 7,992,927 B2
(45) Date of Patent: Aug. 9, 2011

(54) REINFORCING BRACE

(75) Inventors: Eiji Kitai, Toyota (JP); Hiroyuki Degawa, Okazaki (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 12/757,080

(22) Filed: Apr. 9, 2010

(65) Prior Publication Data
US 2010/0320801 A1 Dec. 23, 2010

(30) Foreign Application Priority Data

Jun. 17, 2009 (JP) .................................. 2009-143888

(51) Int. Cl.
*B62D 25/00* (2006.01)
(52) U.S. Cl. ..................................... 296/204; 296/180.1
(58) Field of Classification Search ............... 296/146.6, 296/204, 180.1
See application file for complete search history.

(56) References Cited

U.S. PATENT DOCUMENTS

| | | | | |
|---|---|---|---|---|
| 5,756,167 A | * | 5/1998 | Tamura et al. | 428/31 |
| 5,813,718 A | * | 9/1998 | Masuda et al. | 296/146.6 |
| 7,182,393 B2 | * | 2/2007 | Guiles | 296/146.6 |
| 2003/0173799 A1 | | 9/2003 | Wendland et al. | |

FOREIGN PATENT DOCUMENTS

| | | |
|---|---|---|
| EP | 1 251 061 A1 | 10/2002 |
| EP | 1 852 335 A1 | 11/2007 |
| JP | 2008-279951 A1 | 11/2008 |
| WO | 01/85528 A1 | 11/2001 |

* cited by examiner

*Primary Examiner* — Dennis H Pedder
(74) *Attorney, Agent, or Firm* — Burr & Brown

(57) ABSTRACT

A reinforcing brace excellent in productivity and cost performance is provided which can advantageously improve a rigidity of a floor panel without deteriorating aerodynamic performance. The reinforcing brace comprising a longitudinal press-formed product including a cylindrical section 12 located at a middle area in a longitudinal direction thereof and flat portions 44, 44 located at end areas in the longitudinal direction thereof. Further, an outer surface of the cylindrical section 12 is made as regulating surfaces 26, 32, 36 which reduce air resistance by regulating a flow of air passing under the vehicle body. Furthermore, a plurality of insertion holes 46 are positioned in the flat portions 44, 44 into which fastener members are inserted.

8 Claims, 10 Drawing Sheets

REINFORCING BRACE

The present application is based on Japanese Patent Application No. 2009-143888 filed on Jun. 17, 2009, the contents of which are incorporated herein by reference.

BACKGROUND OF THE INVENTION

1. Field of the Invention

The present invention relates to a reinforcing brace. More particularly, the present invention relates to an improvement of the reinforcing brace for reinforcing a floor panel, which is installed to an undersurface of the floor panel of a vehicle so as to extend in a vehicle width direction.

2. Discussion of Related Art

Conventionally, various safety standards for vehicles such as motorcars are set to protect occupants from injuries resulting from impact collisions. Such safety standards for vehicle and the like are becoming more stringent year by year. A new safety standard to protect occupants from injuries resulting from side impact collisions (hereinafter, referred to as a side impact safety standard) was introduced in a few years ago. The side impact safety standard requires not only a side panel such as a door panel but also a floor panel providing a floor of vehicle to meet the standard. Thus, in recent years, as one option to meet the side impact safety standard required to the floor panel, a longitudinal reinforcing brace for improving the strength of the floor panel has been increasingly installed to the floor panel so as to extend in a vehicle width direction.

As such a reinforcing brace or reinforcement device for use in a floor panel, there are known a reinforcing brace formed of a metal pipe (see, JP-A-2008-279951) and a reinforcing brace composed of a press-formed product having an angular U-shaped cross sectional shape which is made by a longitudinal plate formed of a super high tensile strength steel through hot press, for example. However, the following problems are inherent in the conventional reinforcing braces formed of the pipe and the press-formed product having an angular U-shaped cross sectional shape.

Specifically, in the reinforcing brace formed of a pipe, a plurality of insertion holes for fastener members such as bolts, which allow the reinforcing brace to be installed to a floor panel, are positioned in installation sections located at both end sides in a longitudinal direction (axial direction) of the reinforcing brace. However, the width of the installation section of such reinforcing brace is inevitably small, because the installation sections of the reinforcing brace are formed by pressing both end side portions in a longitudinal direction of the pipe so as to have a flat shape. In other words, the width of the installation section is limited by the outside diameter of the pipe. Therefore, it is difficult to freely set a position and interval of the plurality of insertion holes in the installation section of such a small width. Consequently, it is also difficult to freely set a position of the fastener members, which are inserted into the insertion holes positioned in the installation section, when installing the reinforcing brace beneath the floor panel. Meanwhile, the floor panel to which the reinforcing brace is installed generally has a lot of concave and convex portions, and various members and parts are installed thereto. For this reason, when the reinforcing brace formed of a pipe is used as a reinforcing brace for a floor panel, installation of the fastener members, which are inserted into the insertion holes of the installation section, to the floor panel by the fastener members poses difficulties, because there is few flat area in the floor panel and it is difficult to set a position of the reinforcing brace so as not to be in contact with the other members and parts installed to the floor panel.

Even in such a reinforcing brace formed of a pipe, if flat brackets of large width are joined by welding, for example, to both end portions in a longitudinal direction of the pipe to form installation sections, position and arrangement intervals of a plurality of insertion holes positioned in the installation section can be set freely. However, due to the welding of the brackets, the number of facilities and processes in the production of the reinforcing brace will increase. Further, the number of parts for the reinforcing brace will increase because of the employment of the bracket, which is an independent member from the pipe. Consequently, deterioration in productivity of the reinforcing brace and an increase in the production cost thereof will be inevitably caused.

Meanwhile, the reinforcing brace formed of a press-formed product having an angular U-shaped cross sectional shape has a configuration in which a side wall is vertically provided on each side in a width direction of a longitudinal flat portion. Therefore, in such reinforcing brace, the width of the flat installation sections made of the end portions in a longitudinal direction of the steel plate can be set freely by changing a width of the steel plate, which is a material of the reinforcing brace, or by changing a height of the side wall which is formed by press working against the steel plate, for example. Thus, the position and intervals of the plurality of the insertion holes in the installation section can be freely set. However, torsional rigidity of the reinforcing brace formed of the press-formed product decrease more as the width of the flat portion become bigger. Accordingly, it is difficult to secure the same torsional rigidity as the reinforcing brace formed of a pipe. In addition, when such a reinforcing brace is installed to the undersurface of the floor panel so as to extend in a vehicle width direction, the side walls vertically provided on the both end sides in the width direction of the flat portions are arranged so as to protrude from the floor panel in a vertically downward direction. Due to this arrangement, air resistance under the vehicle body while driving is increased and aerodynamic performance is deteriorated.

SUMMARY OF THE INVENTION

Therefore, the present invention has been made in the light of the situations described above, and an object of the invention is to provide a reinforcing brace which is excellent in productivity and cost performance, and which is stably installed to an undersurface of a floor panel of a vehicle for improving rigidity of the floor panel without deteriorating aerodynamic performance under a vehicle body.

To achieve the aforementioned objects, or to solve the problems understood from description throughout the present specification and drawings, the present invention may be preferably embodied according to various aspects which will be described below. Each aspect described below may be employed in any combination. It is to be understood that the aspects and technical features of the present invention are not limited to those described below, and can be recognized based on the inventive concept disclosed in the whole specification and drawings.

(1) A reinforcing brace which is installed to an undersurface of a floor panel of a vehicle so as to extend in a vehicle width direction for reinforcing the floor panel, the reinforcing brace comprising a longitudinal press-formed product which is obtained by press bending each end portion of a steel plate in a width direction thereof to one side in a thickness direction of the steel plate, the longitudinal press-formed product including: a cylindrical section located at a middle area in a longitudinal direction thereof, a maximum width of the cylindrical section in a front to back direction of the vehicle being larger than a maximum width thereof in a vertical direction of the vehicle in a state where the reinforcing brace is installed to the floor panel, and the cylindrical section having a cross sectional shape which is taken along a plane perpendicular to an axis thereof in which a width of the cylindrical section in the vertical direction gradually decreases from a middle area thereof in the front to back direction of the vehicle toward each end side thereof in the front to back direction of the vehicle, so that an outer surface of the cylindrical section functions as a regulating surface which reduce air resistance by regulating a flow of air passing under the floor panel while driving; and flat portions located at both end side portions in the longitudinal direction thereof, which have not been subjected to a press bending, each of the flat portions having a plurality of insertion holes for fastener members which is used to install the flat portions to the floor panel.

(2) The reinforcing brace according to the above aspect (1), where both end portions in the width direction of the steel plate subjected to a press bending process are abutted and welded to each other in a center portion and each end side portion in an axial direction of the cylindrical section, and gaps are formed between end portions in the width direction of the steel plate in other portions than the center portion and the end side portions in the axial direction of the cylindrical section so as not to be in contact with each other.

(3) The reinforcing brace according to the above aspect (1) or (2), where a pair of folded ribs is formed on the end portions in the width direction of the steel plate by folding each edge portion in the width direction of the steel plates in one direction, the pair of folded ribs protruding toward inside of the cylindrical section and continuously extending in the axial direction, and a gap is formed between the pair of folded ribs so as not to be in contact with each other.

(4) The reinforcing brace according to any one of the above aspects (1) to (3), where a reinforcing rib having a curved outer surface is provided on each end side in the width direction of the flat portion, which corresponds to a direction perpendicular to the axial direction of the cylindrical section, the reinforcing rib being obtained by bending each edge portion in the width direction of the steel plate to one side in the thickness direction.

(5) The reinforcing brace according to any one of the above aspects (1) to (4), where a minimum width of the cylindrical section is smaller than a minimum width of the flat portion, the widths being measured in the direction perpendicular to the axis of the cylindrical section.

(6) The reinforcing brace according to any one of the above aspects (1) to (5), where the reinforcing brace has a planar shape in which the width in a direction perpendicular to a longitudinal direction of the reinforcing brace gradually increases from a center portion in the longitudinal direction to each end portion in the longitudinal direction.

(7) The reinforcing brace according to any one of the above aspects (1) to (6), where the plurality of insertion holes are positioned in the flat portion so as to be arranged in a line in a direction substantially perpendicular to the axial direction of the cylindrical section. Here, the direction substantially perpendicular to the axial direction of the cylindrical section includes a direction that intersects with the axial direction of the cylindrical section at angle slightly smaller or larger than right angle, in addition to the direction that intersects with the axial direction of the cylindrical section at right angle.

(8) The reinforcing brace according to any one of the above aspects (1) to (7), where at least the cylindrical section has a curved shape in which an axis thereof protrudes toward the floor panel side in a state where the reinforcing brace is installed to the floor panel.

In the reinforcing brace according to the present invention, fine productivity can be effectively secured, because it is formed of a longitudinal press-formed product that is obtained by press bending a steel plate. In addition, the reinforcing brace of the present invention can advantageously exhibit the bending rigidity and the torsional rigidity substantially equivalent to the bending rigidity and the torsional rigidity of a reinforcing brace formed of a steel pipe, because the cylindrical section is located at the longitudinally middle area of the press-formed product.

Further, in the reinforcing brace according to the present invention, both end side portions in a longitudinal direction thereof are made as flat portions on which press bending process is not performed, and a plurality of insertion holes are positioned in the flat portions. That is, each of the both end side portions in a longitudinal direction thereof including the flat portions is configured as an installation section for installing the reinforcing brace to the floor panel. Therefore, in such reinforcing brace, similarly to the reinforcing brace formed of a press-formed product having an angular U-shaped cross sectional shape, a width of the installation section for installing the reinforcing brace to the floor panel can be set freely and easily by changing a width of a steel plate which is a material of the reinforcing brace, for example. Accordingly, in the reinforcing brace according to the present invention, although the middle area in a longitudinal direction is made as the cylindrical section, a plurality of insertion holes through which the fastener members are inserted can be positioned in the both end side portions in a longitudinal direction, with a sufficient degree of freedom in determination of position and arrangement intervals thereof, without welding a bracket or the like on each end side portion in the axial direction of the reinforcing brace. As a result, the fastener member inserted into each of the insertion holes can be easily fastened to a flat part of the floor panel without contacting with the other members and parts. Therefore, the whole reinforcing brace can be stably and surely installed to the undersurface of the floor panel.

Furthermore, in the reinforcing brace according to the present invention, the outer surface of the cylindrical section is made as a regulating surface which reduces an air resistance by regulating a flow of air passing under the floor panel while driving. Therefore, the reinforcing brace can regulate the flow of air passing under the vehicle at the regulating surface and reduce the air resistance in a state in which the reinforcing brace is installed to the undersurface of the floor panel of vehicle so as to extend in the vehicle width direction. As a result, it can be effectively prevented that aerodynamic performance of the vehicle is deteriorated due to the installation of the reinforcing brace to the floor panel.

Therefore, in the reinforcing brace according to the present invention, rigidity of the floor panel can be stably and surely improved at the lowest cost possible, without deteriorating aerodynamic performance under the vehicle body and productivity, which may be caused by the installation of the reinforcing brace to the floor panel.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE INVENTION

To further clarify the present invention, there will be described in detail embodiments of the invention with reference to the accompanying drawings.

Figure 1:
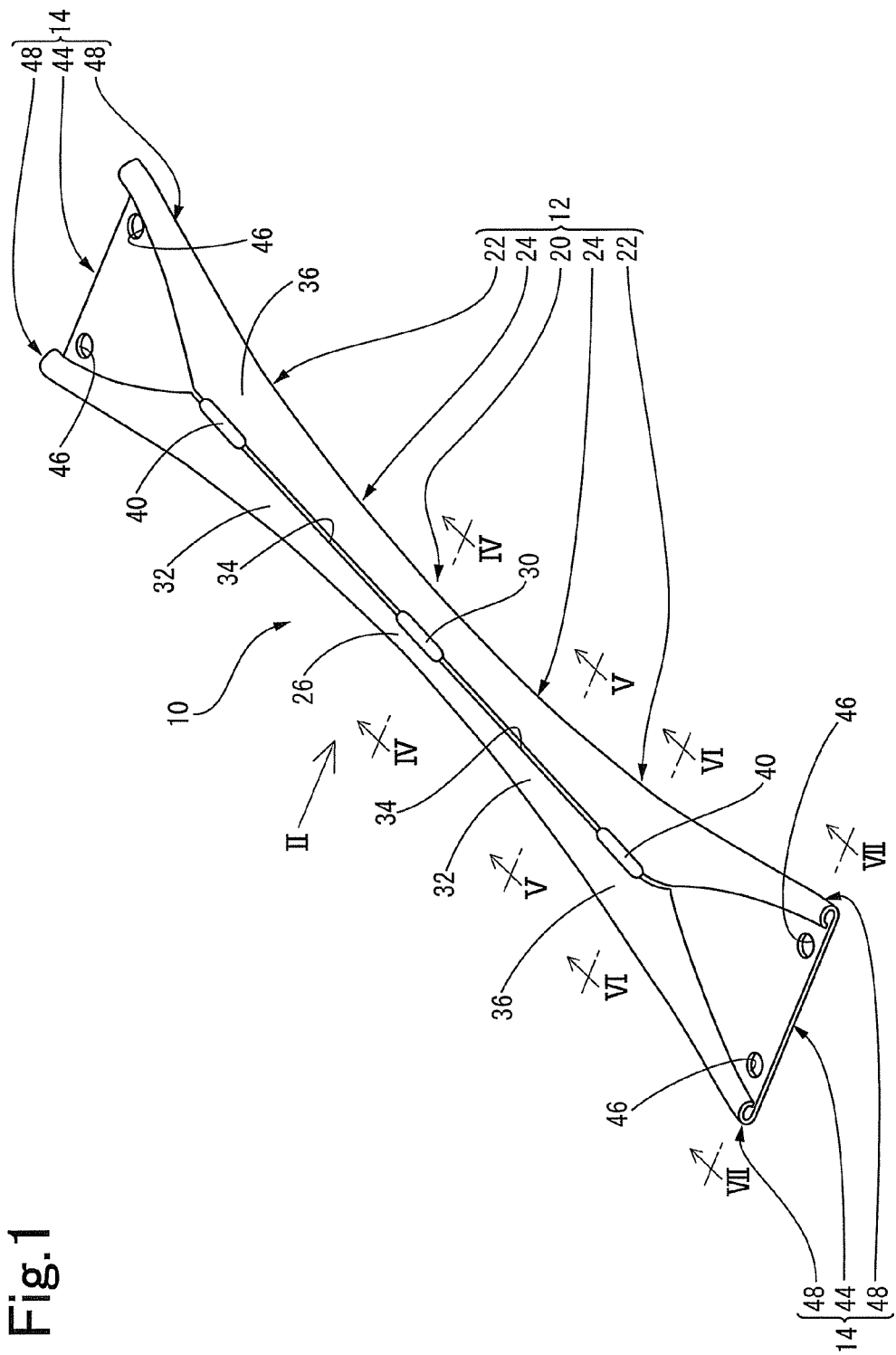
FIG. 1 is a perspective view showing one embodiment of a reinforcing brace according to the present invention.
Figure 2:
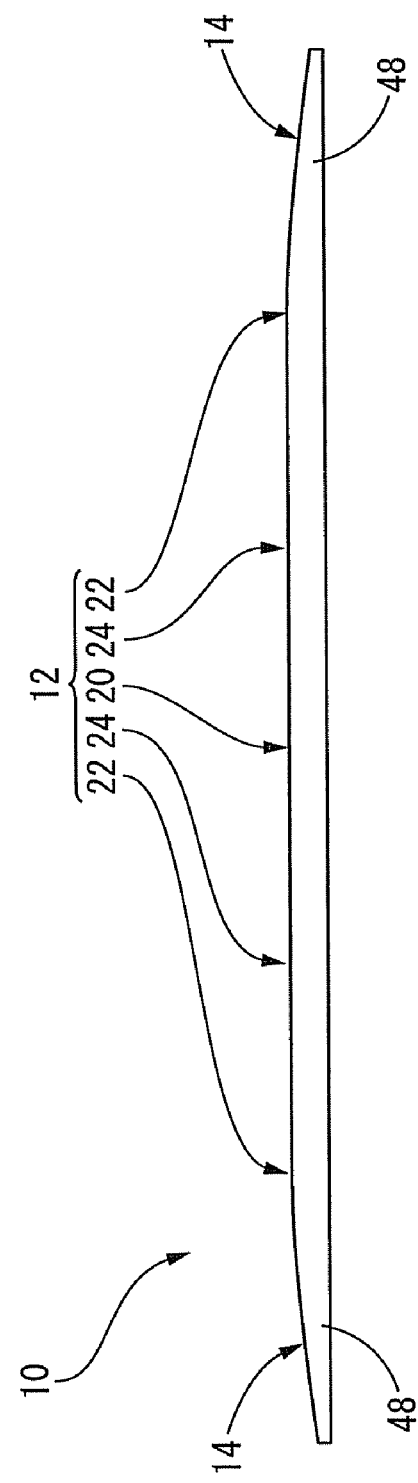
FIG. 2 is an explanation view viewed from a direction of arrow II in FIG. 1.
Figure 3:
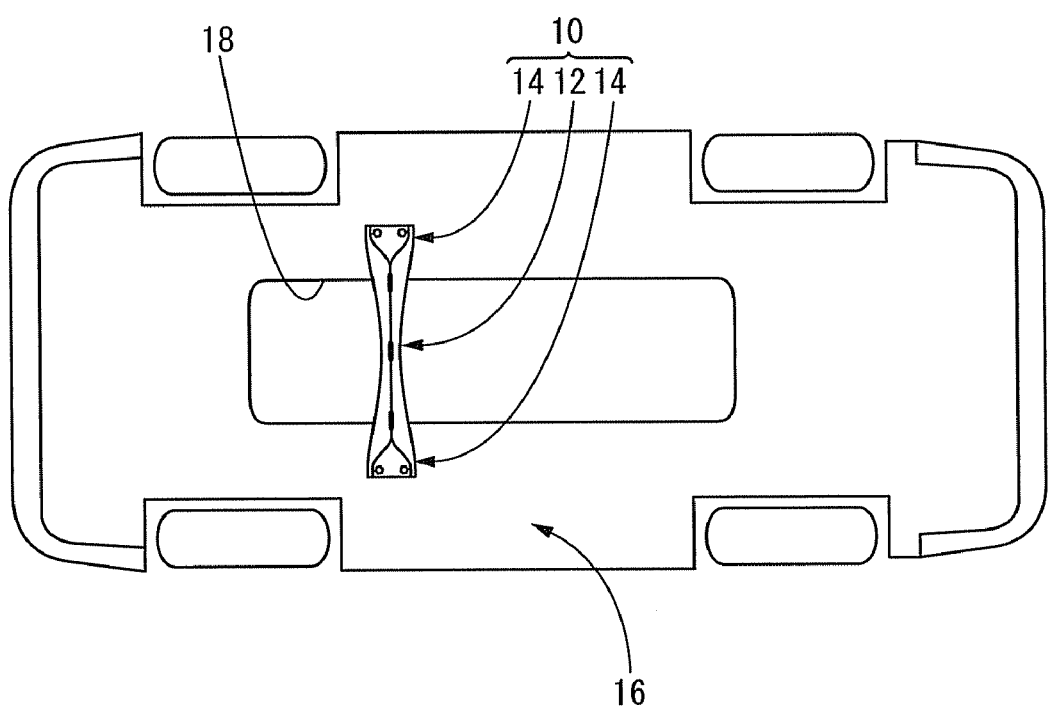
FIG. 3 is an explanation view showing a state in which the reinforcing brace in FIG. 1 is installed to the undersurface of the floor panel of the vehicle.

Initially, FIG. 1 and FIG. 2 show a reinforcing brace for a floor panel in a perspective view and a side view, which is installed to a floor panel of a vehicle, as one embodiment of the reinforcing brace of the present invention. As apparent from these figures, the reinforcing brace 10 of the embodiment is formed of a longitudinal press-formed product which is made by press bending a longitudinal steel plate or a strip of a steel plate. Further, a cylindrical section 12 is located at a middle area in a longitudinal direction of the reinforcing brace 10, and installation sections 14, 14 are located at both longitudinally end side areas of the reinforcing brace 10. Then, as shown in FIG. 3, the reinforcing brace 10 is arranged so as to extend in a vehicle width direction and installed beneath a floor panel 16 of the vehicle. Here, the cylindrical section 12 of the reinforcing brace 10 is arranged so as to across a concave portion 18, which opens downward and is located at the middle of an undersurface of the floor panel 16 in a width direction. Further, under such arrangement, two installation sections 14, 14 of the reinforcing brace 10 are fixed with bolts to the undersurface of the floor panel 16 at both sides in a width direction of the concave portion 18.

More specifically described, both end portions in the width direction (a direction perpendicular to the longitudinal direction) of the middle area in a longitudinal direction of a steel plate (not shown), which is a material of the reinforcing brace 10, is subjected to a press bending process (UO bending process, for example) to one side in a thickness direction thereof such that the end portions are abutted on each other or almost abutted on each other. As a result, the cylindrical section 12 is formed.

As shown in FIG. 1 to FIG. 3, the cylindrical section 12 has a planar shape in which a width (a dimension perpendicular to an axial direction, i.e., a dimension measured in a direction corresponding to a front to back direction of a vehicle in a state where the reinforcing brace 10 is installed to the floor panel 16) is gradually increased from the center portion thereof in an axial direction (longitudinal direction) to each end side portion thereof. In addition, a thickness which is measured in a direction perpendicular to both of the axial direction and the width direction of the cylindrical section 12 (vertical direction in FIG. 2) is made substantially constant over the entire length of the cylindrical section. In this way, a center portion in a longitudinal direction of the cylindrical section 12 is made as a center cylindrical portion 20 having a smallest diameter, and both of end side portions in a longitudinal direction are made as end side cylindrical portions 22, 22 having a larger diameter than that of the center cylindrical portion 20. Further, portions located between the center cylindrical portion 20 and each of the end side cylindrical portions 22, 22 in a longitudinal direction are made as middle cylindrical portions 24, 24 whose diameter is larger than that of the center cylindrical portion 20 and smaller than that of each of the end side cylindrical portions 22, 22.

Figure 4:
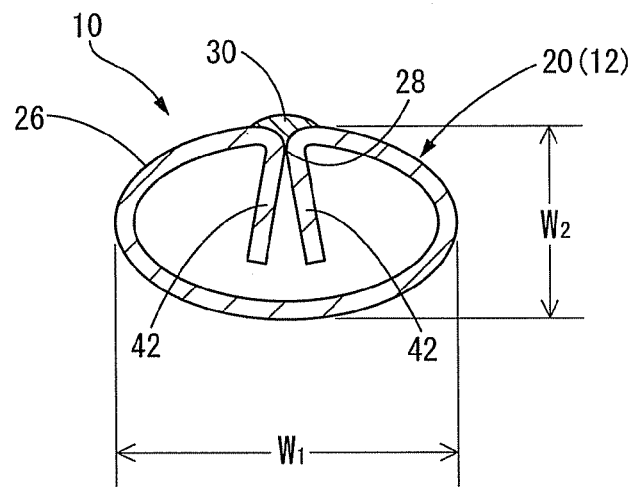
FIG. 4 is an enlarged explanation view of an edge surface taken along the line IV-IV of FIG. 1.

As shown in FIG. 4, the center cylindrical portion 20 has an oval cross sectional shape which is taken along a plane perpendicular to the axis, in which a maximum width in a horizontal direction: $W_1$ in FIG. 4 (a direction corresponding to a front to back direction of a vehicle in a state where the reinforcing brace 10 is installed to the floor panel 16) is larger by a predetermined size than a maximum width in a vertical direction: $W_2$ in FIG. 4 (a direction corresponding to a vertical direction in a state where the reinforcing brace 10 is installed to the floor panel 16). In other words, the cross sectional shape which is taken along a plane perpendicular to the axis of the center cylindrical portion 20 is a horizontally long oval shape in which a horizontal direction in FIG. 4 is a long axis direction of the long oval shape. As a result, in a state where the reinforcing brace 10 is installed to the undersurface of the floor panel 16, the width in a vertical direction or a height of the center cylindrical portion 20 is gradually and smoothly decreased from the middle in a front to back direction of vehicle to each of the front side and the back side.

In this way, the whole outer peripheral surface of the center cylindrical portion 20 is made as a center regulating surface 26 having a shape which reduces a resistance against the air flowing in a horizontal direction in FIG. 4. Due to the center regulating surface 26, while driving a vehicle in which the reinforcing brace 10 is installed to the undersurface of the floor panel 16, a flow of air passing under the center area in the width direction of the floor panel 16 is regulated at the center regulating surface 26, thereby reducing air resistance. Hereinafter, in view of a state where the reinforcing brace 10 is installed to the undersurface of the floor panel 16 (see, FIG. 2), a vertical direction in FIG. 4, and FIG. 5 to FIG. 7 which will be described later, is referred to as a vertical direction, and a horizontal direction in FIG. 4 to FIG. 7 is referred to as a front to back direction.

Further, a part of the periphery of the center cylindrical portion 20 is made as an abutting portion 28. The abutting portion 28 is formed by abutting end side portions in the width direction of the steel plate to each other through a press bending process. Then, both of the end side portions in the width direction of the steel plate forming the abutting portion 28 are welded to each other. Accordingly, the welding portion 30 is formed on the abutting portion 28 so as to extend in an axial direction with a predetermined length.

Figure 5:
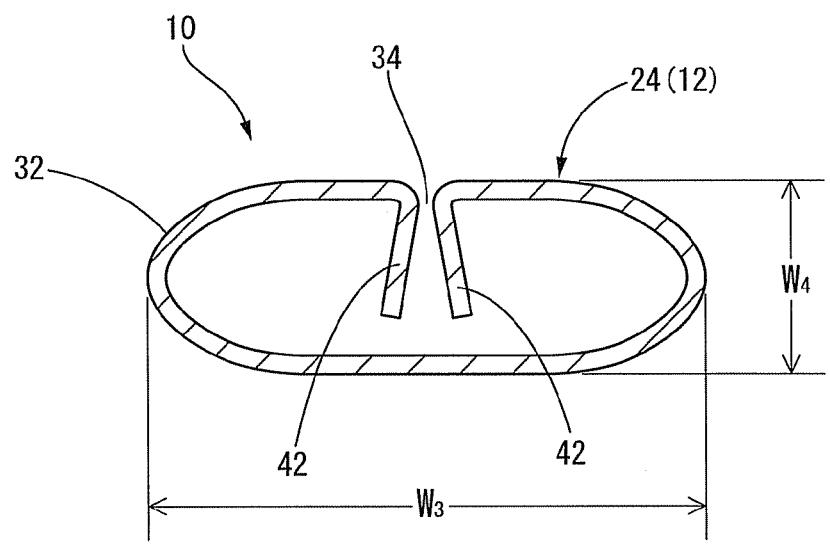
FIG. 5 is an enlarged explanation view of an edge surface taken along the line V-V of FIG. 1.

Meanwhile, as shown in FIG. 5, each middle cylindrical portion 24 has a substantially elliptical cross sectional shape which is taken along a plane perpendicular to the axis, in which a maximum width in the front to back direction: $W_3$ is larger by a predetermined size than a maximum width in the vertical direction: $W_4$. That is, the cross sectional shape of each end side area of the middle cylindrical portion 24 in the front to back direction, which is taken along a plane perpendicular to the axis, is a horizontally long semi-oval shape corresponding to the horizontally long oval cross sectional shape of the center cylindrical portion 20 which is taken along a plane perpendicular to the axis, while the cross sectional shape of a middle area in the front to back direction which is taken along a plane perpendicular to the axis is a shape in which two plates extending in a horizontal direction are arranged so as to be opposed to each other in the vertical direction. Accordingly, the width in the vertical direction of each middle cylindrical portion 24 is made substantially constant in the middle area in a front to back direction, and the width in the vertical direction in both of the end side areas in the front to back direction is gradually and smoothly decreased from the middle area to each of the end sides in the front to back direction.

In this way, the whole outer peripheral surface of the two middle cylindrical portions 24, 24 are made as middle regulating surfaces 32, 32, respectively, having a shape which reduces a resistance against the air flowing in a horizontal direction in FIG. 5. Due to the middle regulating surfaces 32, 32, while driving a vehicle in which the reinforcing brace 10 is installed to the undersurface of the floor panel 16, air flow passing under two middle areas which are located between the center portion and each end side portion in the width direction of the floor panel 16 is regulated at the two middle regulating surfaces 32, 32, thereby reducing air resistance.

Each of the middle cylindrical portions 24 is formed by press bending both of the end side portions in the width direction of the steel plate, so as not to be in contact with each other. In other words, in each of the middle cylindrical portion 24, on a part of the periphery thereof, a gap 34 having a small width is provided so as to extend in an axial direction.

Figure 6:
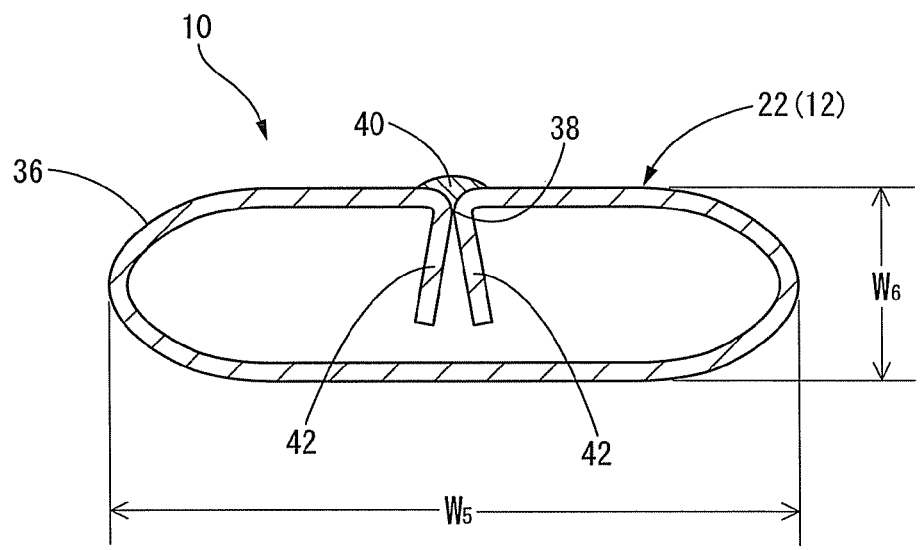
FIG. 6 is an enlarged explanation view of an edge surface taken along the line VI-VI of FIG. 1.

As shown in FIG. 6, each of the two end side cylindrical portions 22 has a substantially elliptical cross sectional shape, which is taken along a plane perpendicular to the axis, in which a maximum width in the front to back direction: $W_5$ is larger than a maximum width in the vertical direction: $W_6$, and is larger than the maximum width in the front to back direction of the middle cylindrical portion 24: $W_3$ by a predetermined size. In such end side cylindrical portion 22, like the middle cylindrical portion 24, the cross sectional shape of each end side area in the front to back direction, which is taken along a plane perpendicular to the axis, is a horizontally long semi-oval shape corresponding to the cross sectional shape of the center cylindrical portion 20 which is taken along a plane perpendicular to the axis, and the cross sectional shape of a middle area in the front to back direction, which is taken along a plane perpendicular to the axis, is a shape in which two plates extending in a horizontal direction are arranged so as to be opposed to each other in the vertical direction. Due to this arrangement, the width in the vertical direction of each of the end side cylindrical portions 22 is substantially constant in the middle area in the front to back direction, and the widths in the vertical direction in both end side areas in the front to back direction gradually and smoothly decrease from the middle area to the each end side in the front to back direction. In addition, the width in the front to back direction of the middle area in the front to back direction of each end side cylindrical portion 22 is made larger than that of the middle cylindrical portion 24. Thus, the width in the front to back direction of the whole of the end side cylindrical portion 22 is larger than that of the whole of the middle cylindrical portion 24.

In this way, the whole outer peripheral surfaces of the two end side cylindrical portions 22, 22 are made as end regulating surfaces 36, 36, respectively, having a shape which reduces a resistance against the air flowing in a horizontal direction in FIG. 6. Due to this arrangement, while driving a vehicle in which the reinforcing brace 10 is installed to the undersurface of the floor panel 16, a flow of air passing under each end side area in the width direction of the floor panel 16 is regulated at the two end regulating surfaces 36, 36, thereby reducing air resistance.

Like the center cylindrical portion 20, a part on the periphery of each of the end side cylindrical portions 22 is made as an abutting portion 38. The abutting portion 38 is formed through a press bending process in which both of end side portions in a width direction of the steel plate are abutted to each other. Then, both of the end side portions in the width direction of the steel plate, which form the abutting portion 38, are welded to each other. Accordingly, the welding portion 40 is formed on the abutting portion 38 so as to extend in the axial direction with a predetermined length.

As shown in FIG. 4 to FIG. 6, in the inside of the cylindrical section 12 including the center cylindrical portion 20, the middle cylindrical portions 24, 24 and the end side cylindrical portions 22, 22, a pair of folded ribs 42, 42 is integrally formed so as to oppose to each other in the front to back direction of vehicle. The pair of the folded ribs 42 protrudes downward toward the inside from the abutting portions 28 of the center cylindrical portion 20 and the abutting portion 38 of each of the end side cylindrical portions 22, and from both end portions of the middle cylindrical portions 24 which have the gap 34 therebetween. Further, the folded rib 42 has a plate like shape extending continuously in the axial direction of the cylindrical section 12. Of the pair of the folded ribs 42, 42, one located at the front side inclines forward in the downward direction, while one located at the back side inclines backward in the downward direction. Accordingly, the pair of the folded ribs 42, 42 opposed to each other in the front to back direction is not in contact with each other. Here, the pair of the folded ribs 42, 42 is formed by subjecting both edge portions in the width direction of a steel plate to a press bending process in one direction in the thickness direction (in a direction in which a steel plate is subjected to a press bending process to form the cylindrical section 12).

As described above, the cylindrical section 12 has a horizontally long elliptical or oval cross sectional shape which is taken along a plane perpendicular to the axial direction, and also has the pair of the folded ribs 42, 42 that protrudes toward the inside and that is integrally formed so as to extend in the axial direction, thereby advantageously exhibiting a sufficient bending rigidity.

Further, a torsional rigidity is improved because the cylindrical section 12 has the horizontally long elliptical or oval cross sectional shape which is taken along a plane perpendicular to the axial direction. Furthermore, the welding portion 30 is formed on the abutting portion 28 of the center cylindrical portion 20 located at the center portion in the axial direction, and the welding portions 40 are formed on the abutting portions 38 of the end side cylindrical portions 22 located at the end side portions in the axial direction, which are starting points of the torsional deformation when the cylindrical section 12 is torsionally deformed. Consequently, the torsional rigidity of the cylindrical section 12 is more effectively improved.

In addition, an outer surface of the cylindrical section 12 consists of the center regulating surface 26, the middle regulating surfaces 32, 32 and the end regulating surfaces 36, 36. Accordingly, while driving the vehicle in which the reinforcing brace 10 is installed to the undersurface of the floor panel 16, the flow of air passing under the floor panel 16 is regulated by the whole outer surface of the cylindrical section 12, thereby advantageously reducing the air resistance.

Figure 7:
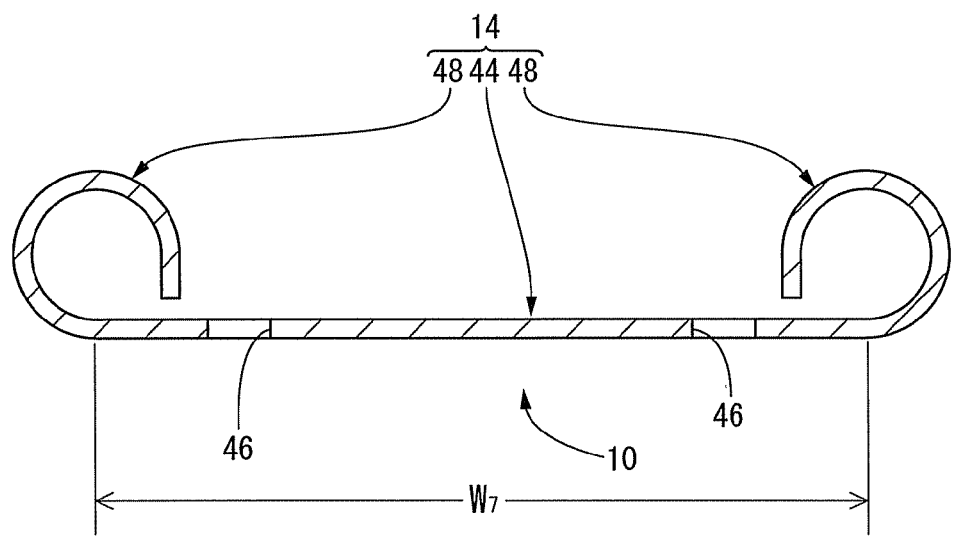
FIG. 7 is an enlarged explanation view of an edge surface taken along the line VII-VII of FIG. 1.

Meanwhile, as shown in FIG. 1 and FIG. 7, the installation sections 14, 14, which are located at both end sides in the longitudinal direction of the reinforcing brace 10 with the cylindrical section 12 therebetween, include flat portions 44, 44, respectively. Each of the flat portions 14 is formed of a portion of the end portions in the longitudinal direction of the steel plate that is not subjected to a press bending process. Further, each flat portion 44 has a substantially triangle flat shape in which the width in the front to back direction gradually increases toward the each end side in the longitudinal direction of the reinforcing brace 10. A maximum width in the front to back direction: $W_7$ of the each flat portion 44 is larger than the maximum width in the front to back direction: $W_5$ of the end side cylindrical portion 22.

Then, in the end portion of each flat portion 44 in the longitudinal direction of the reinforcing brace 10, two insertion holes 46, 46 penetrating the end portion are positioned so as to be in a line in the front to back direction (in a direction perpendicular to the axial direction of the cylindrical section 12). Each of the two insertion holes 46, 46 is positioned in each end side in the front to back direction of the flat portion 44. As a result, a space between the two insertion holes 46, 46 is sufficiently larger than the width in the front to back direction of the center cylindrical portion 20 and the width in the front to back direction of each of the middle cylindrical portions 24.

On each of end sides in the front to back direction of each of the installation sections 14 with the flat portion 44 therebetween, a reinforcing rib 48 is formed, respectively. Each of the reinforcing ribs 48 has a shape in which both ends in the front to back direction (width direction) of the installation section 14 are bended such that an upper surface of the installation section 14 becomes inner surfaces. A cross sectional shape in the front to back direction (a cross sectional shape corresponding to the cross sectional shape which is taken along a plane perpendicular to the axial direction of the cylindrical section 12) of the reinforcing rib 48 is substantially circular shape or horizontally long elliptical shape. Accordingly, the bending rigidity and the torsional rigidity of the installation section 14 including the flat portion 44 is advantageously improved. Further, as apparent from FIG. 2, in each of the reinforcing ribs 48, the thickness which is measured in a direction perpendicular to both of the axial direction and the width direction (i.e., vertical direction in FIG. 2) of the cylindrical section 12 gradually decrease from the center portion side of the reinforcing brace 10 (cylindrical section 12 side) toward each end side in the longitudinal direction. In addition, an outer surface of each of the reinforcing ribs 48 is made as a protruded curved surface so as not to inhibit the reduction of air resistance achieved by each of the above-described regulating surfaces 26, 32, 36 of the cylindrical section 12.

In addition, as shown in FIG. 1, the width in the front to back direction of each of the reinforcing ribs 48 gradually and gently increases from each end portion side in the longitudinal direction of the reinforcing brace 10 toward the center portion side thereof. Accordingly, each of the reinforcing ribs 48 and the cylindrical section 12 are gently connected, and thus, when a bending load or a torsional load is applied to the reinforcing brace 10, unnecessary stress concentration or the like on each of the installation sections 14 or the cylindrical section 12 will not be caused. Further, the curved end portion of each of the reinforcing ribs 48 is not in contact with the flat portion 44. Here, each of the reinforcing ribs 48 is formed by subjecting both edge portions in the width direction of the steel plate, which are located at the both end side portions in the longitudinal direction of the steel plate, to a press bending process in one direction in the thickness direction (in a direction in which a steel plate is subjected to a press bending process to form the cylindrical section 12).

As described above, the reinforcing brace 10 of the present embodiment is formed of the press-formed product which is obtained by subjecting one steel plate to a press bending process. Further, in the middle area in the axial direction of the reinforcing brace 10, the cylindrical section 12 having excellent bending rigidity and torsional rigidity is located, and in both of the end side areas in the axial direction of the reinforcing brace 10, the installation sections 14, 14 are located, respectively, which have the flat portion 44 having two insertion holes 46, 46 arranged in the direction perpendicular to the axial direction. Furthermore, the outer surface of the cylindrical section 12 consists of the center regulating surface 26, the middle regulating surface 32, 32 and the end regulating surfaces 36, 36.

As a result, unlike the conventional reinforcing brace formed of a pipe, in the reinforcing brace 10, bolts can be freely installed to the floor panel 16 and the installation spacing or intervals of the bolts can be freely set so as not to contact with the convex-concave surface of the floor panel 16 and various members located in the floor panel 16, without welding a bracket or the like on each end side portion in the axial direction of the reinforcing brace 10. Further, unlike the conventional reinforcing brace formed of a press-formed product having an angular U-shaped cross sectional shape, the reinforcing brace 10 of the present invention can advantageously exhibit the bending rigidity and torsional rigidity equivalent to those of a pipe member made of steel, and furthermore, in a state where the reinforcing brace 10 is installed to the undersurface of the floor panel 16 so as to extend in the vehicle width direction, air resistance caused under the vehicle body while driving can effectively be reduced.

For the above reason, the reinforcing brace 10 according to the present embodiment can be installed stably and surely to the undersurface of the floor panel 16. Then, the rigidity of the floor panel 16 in the width direction can be advantageously improved without deteriorating aerodynamic performance and productivity, and without increasing production cost which are caused by the use of extra members such as a bracket and the like.

Further, in the reinforcing brace 10, the pair of the folded ribs 42, 42 is provided in the inside of the cylindrical section 12 so as to extend in the axial direction. In addition to that, the welding portions 30, 40 are provided on the abutting portions 28, 38 of the center cylindrical portion 20 and the end side cylindrical portions 22, 22, from which the torsional deformation in the cylindrical section 12 starts. In this way, the bending rigidity and the torsional rigidity of the cylindrical section 12 are much more improved. Consequently, the rigidity of the floor panel 16 can be much more effectively improved.

Further, the reinforcing brace 10 of the present embodiment is composed of the press-formed product that is obtained by press bending one steel plate. In addition, the reinforcing ribs 48, 48 of each of the installation sections 14 and the cylindrical section 12 are formed of a continuous portion which is press bended. Accordingly, higher strength and rigidity can be exhibited in the present invention compared to the one composed of a press-formed product of steel plates that is obtained by welding a plurality of steel plates. This also can advantageously improve the rigidity of the floor panel 16.

Furthermore, in the reinforcing brace 10, the two insertion holes 46, 46 are positioned in the end portions of each flat portion 44 so as to be in a line in the direction perpendicular to the axial direction of the cylindrical section 12. This also can improve the rigidity of the floor panel 16.

Further, in the present embodiment, the middle cylindrical portions 24, 24 of the cylindrical section 12 are formed by press bending the both end side portions in the width direction of the steel plate so as not to be in contact with each other, and thus, the gap 34 having a small width is provided at a part of the periphery of each of the middle cylindrical portions 24, 24 so as to extend in the axial direction. Further, the pair of the folded ribs 42, 42 is not allowed to be in contact with each other, and the curved end portion of each reinforcing rib 48 integrally formed on each of the installation section 14 is not allowed to be in contact with the flat portion 44. Namely, in the reinforcing brace 10 of the present embodiment, no parts are in contact with each other, except for the abutting portions 28, 38 of the center cylindrical portion 20 and the end side cylindrical portions 22, 22, on which the welding portions 30, 40 are formed.

Consequently, in the reinforcing brace 10, a coating film (cationic coating, for example), metal-plating film or the like for anti-corrosion or antirust can be surely formed on the whole of the outer periphery of the reinforcing brace 10, expect for the portions welded by welding portion 30, 40. As a result, although the reinforcing brace 10 is installed to the undersurface of the floor panel 16 where it is difficult to prevent corrosion, excellent anti-corrosion characteristics can be advantageously retained over a long period of time, thereby advantageously exhibiting more excellent durability.

In addition, in the present embodiment, the width in the vertical direction of the cylindrical section 12 is set to be substantially constant, and the width in the front to back direction thereof is gradually increased from the center in the axial direction toward each of the axial end sides of the cylindrical section 12. Further, a minimum width in the front to back direction of the cylindrical section 12 is made smaller than a maximum width in the front to back direction of the flat portion 44 of each installation section 14. As a result, as a steel plate that is used as a material of the reinforcing brace 10, a steel plate having a shape in which the width thereof gradually decreases from each end side in the longitudinal direction toward the center can be employed. In this way, weight of the reinforcing brace 10 can be advantageously reduced as compared to the reinforcing brace formed of a steel plate having a rectangular shape with a constant width over the entire length.

Figure 8:
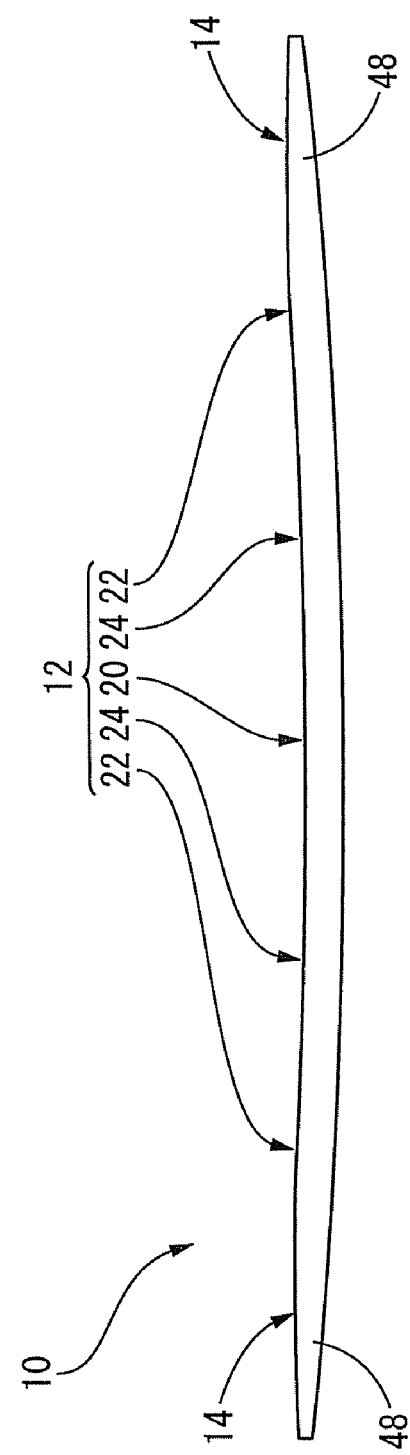
FIG. 8 is a view showing another embodiment of the reinforcing brace according to the present invention, and corresponding to FIG. 2.

Next, in FIG. 8, another embodiment that has a structure slightly different from the above embodiment is shown. With respect to the embodiment shown in FIG. 8, the same reference numerals as used in FIG. 1 to FIG. 7 are used for members and portions having the same structures as those of the above-mentioned embodiment, and a detailed explanation of which is dispensed with.

Specifically, as apparent from FIG. 8, the whole shape of the reinforcing brace 10 of the present embodiment including the cylindrical section 12 and the two installation sections 14, 14 located at both end sides in the axial direction of the cylindrical section 12 is a bow shape in which an axis thereof curves. Particularly, the whole shape is curved to protrude to the floor panel 16 side, namely protrude upward, in a state where the reinforcing brace is installed to the floor panel 16.

According to the study conducted by the inventors of the present invention, when the floor panel 16 is deformed so as to bend or curve in the vehicle width direction by the side impact collision, to which the conventional reinforcing brace that is formed of a pipe or a press-formed product having a U-shaped cross sectional shape and that is extended straight in a horizontal direction is installed, it is proved that the reinforcing brace is also curved and deformed in a direction opposite to the floor panel 16, i.e., the reinforcing brace is curved and deformed so as to protrude downward. It is conceivable from the above that, during the side impact collision, a force that curves and deforms the reinforcing brace so as to be protruded downward acts on the reinforcing brace that is installed to the floor panel.

However, as described above, the reinforcing brace 10 of the present embodiment has a curved shape protruding upward (downward in FIG. 8) in a state where the reinforcing brace 10 is installed to the floor panel 16. Accordingly, in the reinforcing brace 10 of the present embodiment, even if a force that deforms the reinforcing brace 10 in a curved shape protruding downward is acted on the reinforcing brace 10 when the side impact collision is occurred, sufficient strength and rigidity against the acting force is exhibited. Consequently, the reinforcing brace 10 is not easily subjected to bending deformation.

Accordingly, the reinforcing brace 10 according to the present embodiment can stably and surely exhibit the function that improves the rigidity of the floor panel 16 by not being easily deformed when the side impact collision is occurred in a state where the reinforcing brace 10 is installed to the undersurface of the floor panel 16. As a result, the rigidity of the floor panel 16 can be more effectively and stably improved.

While the specific embodiment of the present invention has been described in detail, for illustrative purpose only, it is to be understood that the present invention is not limited to the details of the illustrated embodiments.

For example, in the first embodiment described above, the center cylindrical portion 20, the middle cylindrical portions 24, 24 and the end side cylindrical portions 22, 22 of the cylindrical section 12 have different cross sectional shapes which are taken along a plane perpendicular to the axial direction. However, the cross sectional shape of the cylindrical section 12 which is taken along a plane perpendicular to the axial direction may be the same over the entire length in the axial direction.

Further, the shape of the cross sectional shape of the cylindrical section 12 that is taken along a plane perpendicular to the axial direction thereof is not limited to the illustrated embodiments. The cross sectional shape may be any shape as long as, in a state where the floor panel 16 is installed, the maximum width of the cylindrical section 12 in the front to back direction of the vehicle is larger than the maximum width in the vertical direction, and the width of the cylindrical section 12 in the vertical direction gradually decreases from the middle area in the front to back direction of the vehicle toward each end side in the front to back direction of the vehicle.

Figure 9:
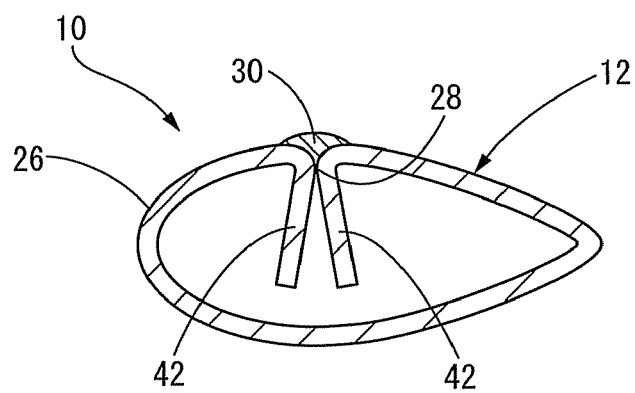
FIG. 9 is a view showing still another embodiment of the reinforcing brace according to the present invention, and corresponding to FIG. 4.
Figure 10:
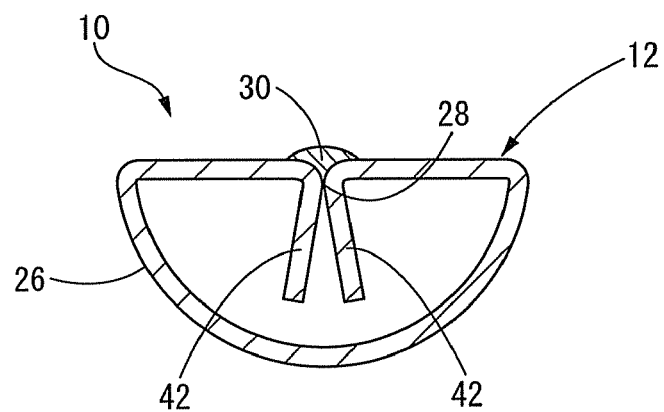
FIG. 10 is a view showing a further embodiment of the reinforcing brace according to the present invention, and corresponding to FIG. 4.
Figure 11:
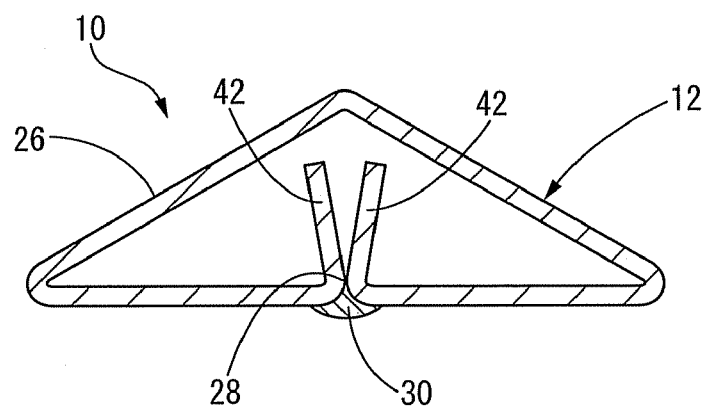
FIG. 11 is a view showing a still further embodiment of the reinforcing brace according to the present invention, and corresponding to FIG. 4.
Figure 12:
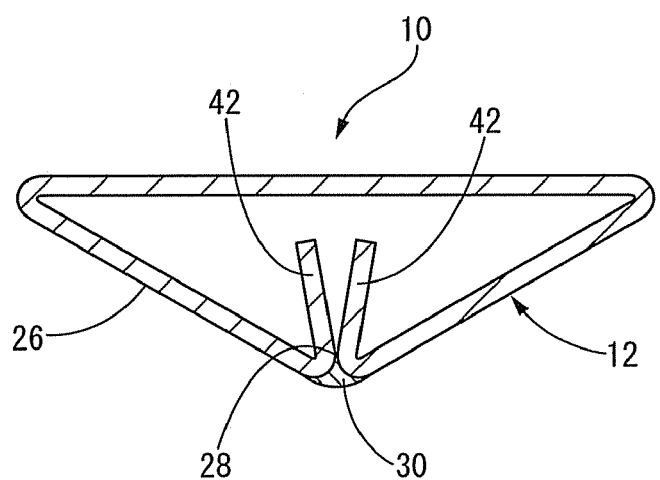
FIG. 12 is a view showing another embodiment of the reinforcing brace according to the present invention, and corresponding to FIG. 4.
Figure 13:
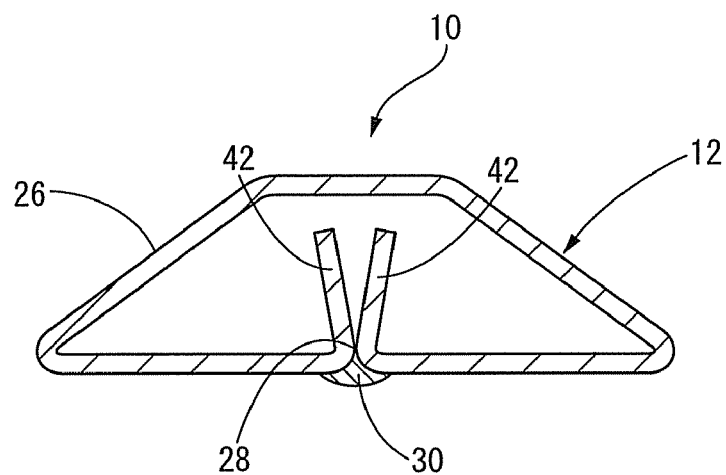
FIG. 13 is a view showing still another embodiment of the reinforcing brace according to the present invention, and corresponding to FIG. 4.
Figure 14:
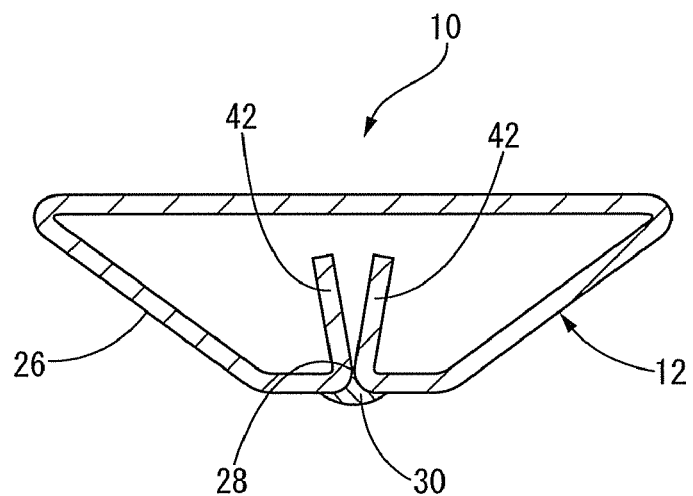
FIG. 14 is a view showing a further embodiment of the reinforcing brace according to the present invention, and corresponding to FIG. 4.
Figure 15:
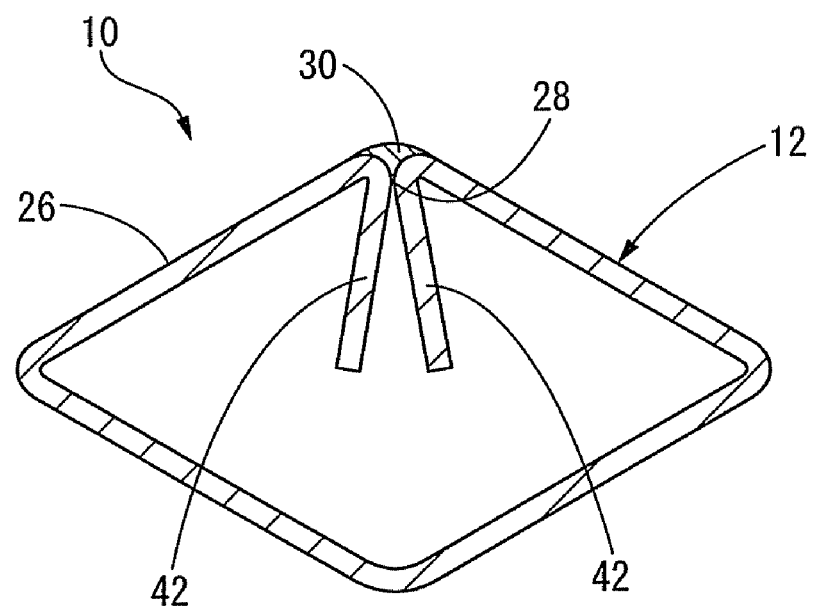
FIG. 15 is a view showing a still further embodiment of the reinforcing brace according to the present invention, and corresponding to FIG. 4.

Specifically, the cross sectional shape of the cylindrical section 12 which is taken along a plane perpendicular to the axial direction may be a shape as shown in FIG. 9, for example, in which the front half thereof is a semi-elliptical shape and the back half thereof is a substantially triangle shape or a wing shape which have a long axis longer than that of the semi-elliptical shape of the front half. Alternatively, the cross sectional shape of the cylindrical section 12 which is taken along a plane perpendicular to the axial direction may be a semi-circular shape as shown in FIG. 10, a triangle shape as shown in FIG. 11, an inverted triangle shape as shown in FIG. 12, a trapezoidal shape as shown in FIG. 13, an inverted trapezoidal shape as shown in FIG. 14, and a lozenge shape as shown in FIG. 15. With respect to some embodiments shown in FIG. 9 to FIG. 15, the same reference numerals as used in FIG. 1 to FIG. 7 are used for members and portions having the same structures as those of the above-mentioned first embodiment, and a detailed explanation of which is dispensed with.

The pair of the folded ribs 42, 42 protruding toward the inside of the cylindrical section 12 is not essential in the present invention. However, when the pair of the folded ribs 42, 42 is provided in the cylindrical section 12, as apparent from FIG. 9 to FIG. 15, each folded rib 42 may protrude upward or downward and the position thereof may be suitably changed.

Further, the width in the front to back direction of the reinforcing brace 10 may be constant over the entire length. Specifically, the width in the front to back direction of the cylindrical section 12 may be constant over the entire length. Further, the width of the cylindrical section 12 may be the same width as the width in the front to back direction of the installation sections 14, 14.

Furthermore, the position of the insertion hole 46 in each of the flat portions 44 is not limited to the illustrated position, and the number thereof may be three or more. The position and the number of the insertion hole 46 may be suitably changed depending on the shape of the floor panel 16, the installation position of the reinforcing brace 10 to the floor panel 16, and the like.

In addition, in the second embodiment, although the whole reinforcing brace including the cylindrical section 12 and the two installation sections 14, 14 has a bow shape protruding upward, the whole reinforcing brace may have any shape as long as at least the cylindrical section 12 has such a curved shape or bow shape. Specifically, each installation section 14 may have a shape extending in a straight in a horizontal direction. In this case, the flat portion 44 of each installation section 14 is surely allowed to be in close contact with a flat part and the like of the undersurface of the floor panel 16. Consequently, each installation section 14 can be surely and stably installed to the floor panel 16.

It is also to be understood that the present invention is advantageously applicable to the reinforcing brace that is installed to an undersurface of a floor panel of a vehicle other than automobiles.

Although further details will not be described herein, it is to be understood that the present invention may be embodied with various other changes and modifications which may occur to those skilled in the art, without departing from the spirit and scope of the invention.

What is claimed is:

1. A reinforcing brace which is installed to an undersurface of a floor panel of a vehicle so as to extend in a vehicle width direction for reinforcing the floor panel, the reinforcing brace comprising a longitudinal press-formed product which is obtained by press bending each end portion of a steel plate in a width direction thereof to one side in a thickness direction of the steel plate, the longitudinal press-formed product including:

a cylindrical section located at a middle area in a longitudinal direction thereof, a maximum width of the cylindrical section in a front to back direction of the vehicle being larger than a maximum width thereof in a vertical direction of the vehicle in a state where the reinforcing brace is installed to the floor panel, and the cylindrical section having a cross sectional shape which is taken along a plane perpendicular to an axis thereof in which a width of the cylindrical section in the vertical direction gradually decreases from a middle area thereof toward each end side thereof, so that an outer surface of the cylindrical section functions as a regulating surface which reduce air resistance by regulating a flow of air passing under the floor panel while driving; and flat portions located at both end side portions in the longitudinal direction thereof, which have not been subjected to a press bending, each of the flat portions having a plurality of insertion holes for fastener members which is used to install the flat portions to the floor panel.

2. The reinforcing brace according to claim 1, wherein both end portions in the width direction of the steel plate subjected to a press bending process are abutted and welded to each other in a center portion and each end side portion in an axial direction of the cylindrical section, and gaps are formed between end portions in the width direction of the steel plate in other portions than the center portion and the end side portions in the axial direction of the cylindrical section so as not to be in contact with each other.

3. The reinforcing brace according to claim 1, wherein a pair of folded ribs is formed on the end portions in the width direction of the steel plate by folding each edge portion in the width direction of the steel plates in one direction, the pair of folded ribs protruding toward inside of the cylindrical section and continuously extending in the axial direction, and a gap is formed between the pair of folded ribs so as not to be in contact with each other.

4. The reinforcing brace according to claim 1, wherein a reinforcing rib having a curved outer surface is provided on each end side in the width direction of the flat portion, which corresponds to a direction perpendicular to the axial direction of the cylindrical section, the reinforcing rib being obtained by bending each edge portion in the width direction of the steel plate to one side in the thickness direction.

5. The reinforcing brace according to claim 1, wherein a minimum width of the cylindrical section is smaller than a minimum width of the flat portion, the widths being measured in the direction perpendicular to the axis of the cylindrical section.

6. The reinforcing brace according to claim 1, wherein the reinforcing brace has a planar shape in which the width in a direction perpendicular to a longitudinal direction of the reinforcing brace gradually increases from a center portion in the longitudinal direction to each end portion in the longitudinal direction.

7. The reinforcing brace according to claim 1, wherein the plurality of insertion holes are positioned in the flat portion so as to be arranged in a line in a direction substantially perpendicular to the axial direction of the cylindrical section.

8. The reinforcing brace according to claim 1, wherein at least the cylindrical section has a curved shape in which an axis thereof protrudes toward the floor panel side in a state where the reinforcing brace is installed to the floor panel.

* * * * *